July 4, 1933.   L. P. HYNES ET AL   1,916,861
WATER STORAGE HEATER
Filed June 28, 1928

Inventors
Lee P. Hynes and Harry A. Williams,
By their Attorney
E. M. Bentley

Patented July 4, 1933

1,916,861

UNITED STATES PATENT OFFICE

LEE P. HYNES AND HARRY A. WILLIAMS, OF ALBANY, NEW YORK, ASSIGNORS TO HYNES & COX ELECTRIC CORPORATION, OF ALBANY, NEW YORK, A CORPORATION OF NEW YORK

WATER STORAGE HEATER

Application filed June 28, 1928. Serial No. 288,943.

Figure 1:
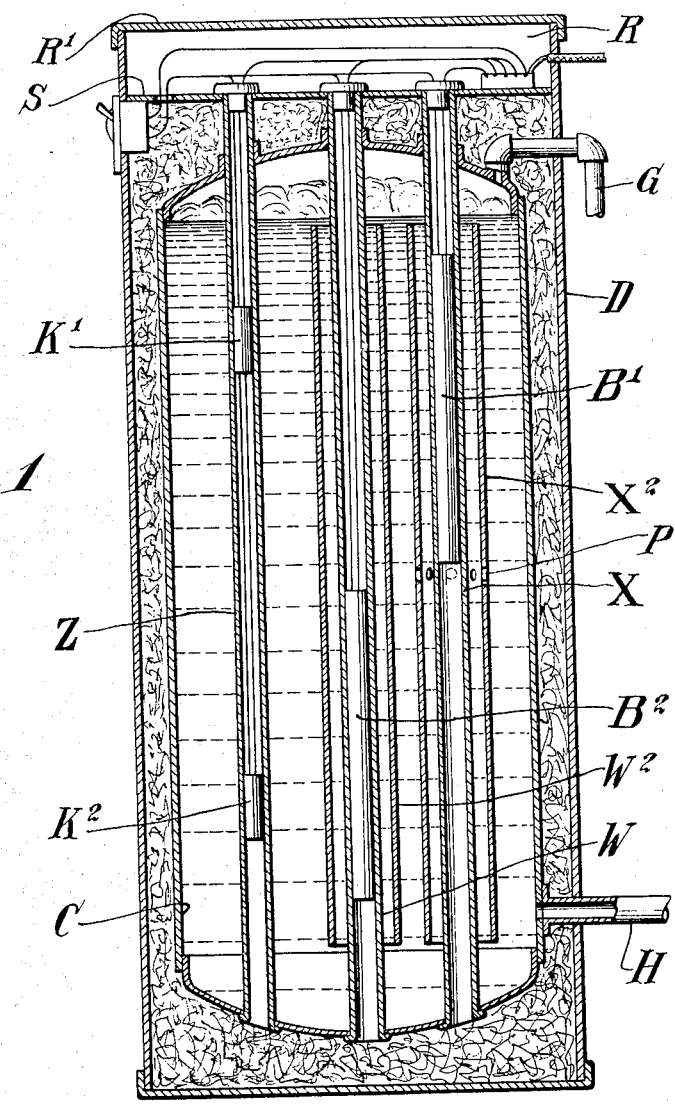
Figure 2:
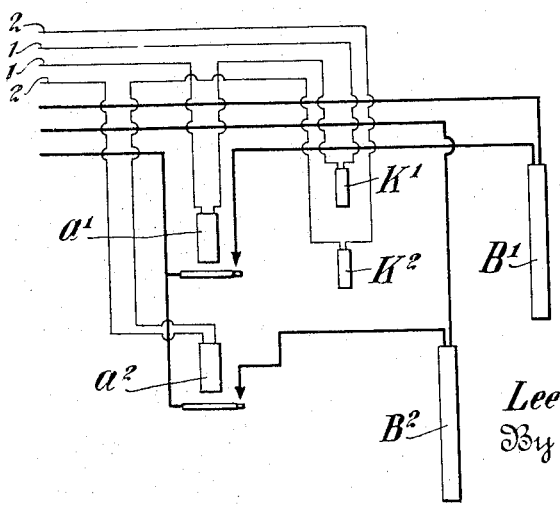

For a detailed description of the present form of our invention, reference may be had to the following specification and to the accompanying drawing forming a part thereof, wherein Fig. 1 illustrates our new heater and Fig. 2 is a diagram of the control circuits therefor.

Our invention relates to tanks wherein there is maintained by storage a constant supply of hot water subject to intermittent withdrawal at irregular intervals.

It is based on a new method of heating control invented by Lee P. Hynes, by which it is possible to cause the reheating of the water in the tank to occur automatically at non-peak hours of the electric supply station while permitting the hot water to be drawn from the tank at all hours. Thereby the charge for the heating current is much reduced since the price of current during the non-peak hours is less than during the peak hours.

Our present invention consists in an improvement in the aforesaid method by which the possible range in volume and temperature of the independent withdrawals is greatly increased. By this improvement we are enabled to get as much hot water from a given tank in the course of a day, under normal household usage, as we could get from the same tank with any other arrangement by a heating element of twice the capacity. We also secure a better service. This striking advantage does not arise, of course, from a higher electrical efficiency in the heaters which is a constant, but from a better utilization of the heat actually expended on the water.

In brief, we employ two heaters in the tank at different levels which may also be of different capacities, each heater having its individual thermostat set for a temperature different from the other. The heating effect of the lower heater, which may be termed the main heater, serves as the point of departure for the super effect of the upper heater, which may be termed the supplementary heater. The practical result is that the bulk of the heating is performed by the main heater under its economical action at the non-peak hours, while the occasional demands for water of a super temperature will be supplied by the upper heater starting from the temperature level which the lower heater provides. This avoids a repetition of heating expenditure on a needless volume of water, while giving much speedier results on the particular volume desired. It should also be noted that it is the storage feature which enables us to postpone the reheating or recovery of temperature to a non-peak period. By our invention, it may be said that we have two storage factors, viz., the long storage provided by the lower heater with its thermostat and a shorter storage provided by the upper heater and its thermostat. Each supplements the other with the result of a greatly energized capacity for a given heater, yet each gives a special character to that output. The lower, longer-acting heater provides the main body of hot water while the upper, shorter-acting heater provides the higher temperature in smaller volumes of water which are maintained separated by gravity from the main body below.

Referring to the drawing D represents an upright outer tank containing a separate inner tank C and a body of intermediate insulations beneath the inside cover plate S. The inner tank C is supplied with cold water by a lower pipe H, while heated water is withdrawn therefrom through an upper pipe G. It is otherwise water-tight but contains three tubes X, W and Z sealed therein and projecting above it through the cover plate S into the operating space R beneath the outside removable cover R¹.

In tube X is the upper heater B¹ while the tube itself is surrounded by an external guide tube X² of larger diameter, and opening into the tank both at top and bottom. The function of this guide tube is to create vertical isolated columns of water within the body of water in the tank. Thus each isolated column is caused to flow repeatedly along the heater in a direction from bottom to top of the tank. The result is adequate heating with a heater of lower temperature which reduces corrosion, the most effective foe of electric water heating. By this feature we have produced a new type of heater known as the low-wattage type because it operates at a comparatively low current rate. Moreover, it enables us to adjust the thermostat to any desired level, because at whatever level it may be set, it will, for its cutting-off function, be subject to approximately the same water-temperature representative of the entire body of water in its control. Otherwise it would cut off at a point representing only the one layer or stratum where it might be set. In tube W is the lower heater $B^2$ which is likewise enclosed in a larger guide tube $W^2$ open at both ends. It is the guide tube which compels uniformity of temperature throughout each of the two bodies of differing temperatures maintained distinct by gravity.

In the third tube Z are the two thermostats $K^1$ and $K^2$ set at different levels. From Fig. 2 it will be manifest that the upper heater $B^1$ will be switched in or out by the magnet $a^1$ which is in a circuit 1—1 controlled by upper thermostat $K^1$, while, similarly, the lower thermostat $K^2$ controls the circuit 2—2 containing magnet $a^2$ that switches in or out the heater $B^2$. The level of both heater and thermostats may be controlled from the operating chamber R being suspended in their respective tubes by their supply wires at any desired level. With the above described arrangement it becomes possible to set the thermostats at a permanent level and adjust the level of both heaters, or even the level of the upper heater only.

It is well understood that the bane of the electrical supply industry is the heavy intermittent load which is thrown on and off frequently and, on the contrary, the ideal load is one that is steady and moderate, particularly so if it is confined wholly or largely to the non-peak hours. It is characteristic of water heating that the demand is intermittent and also tends to occur at the peak, instead of the non-peak hours. Hence it is of vital importance to provide for a storage of hot water, in distinction from systems which attempt to heat only at the moment when the demand for hot water occurs. By storing hot water the time for electric heating thereof may, by our invention, be fixed at some remote hour or partly distributed over hours less remote from the time of withdrawal. The limit to such distribution arrives when the reheating period is made too gradual so that, after one heavy draft of hot water, it takes too long a time—perhaps several hours—to get the entire tankful of water heated to the required temperature. This difficulty is eliminated by our arrangement herein described, whereby an amount of hot water, much less than a tankful, but adequate for most purposes, may be had very quickly at the top of the tank by the upper heater which is then cut off by its local thermostat, while the slower heating of the main body of water s continued by the lower heater. Thereby the entire heating load may be carried by the lower heater unless the intermittent demands become so frequent or protracted, as to bring the upper heater into action to take care of the excess demand. For example, taking a 30-gallon tank in actual normal service with a total heating rating of 2 k. w. a test showed that the upper heater did not come into service at all when the daily consumption was 20 gallons, a moderate amount. When the consumption rose to 40 gallons daily the upper heater came into action twice for short periods. Only when the daily consumption rose to 120 gallons was there a material demand on the upper heater, which, however, still did less work than the lower one. So by our invention, four times the storage capacity of a 30-gallon heater can be used per day with heating elements having only 2 k. w. total rating. This illustrates the great increase in practical output from a given tank which our invention provides. A 60-gallon tank, because of its greater storage capacity, provides by our invention almost as much hot water (100 instead of 120 gallons per day) with a connected load of only 1 k. w. instead of 2 k. w. In brief, by our present invention, we get as much hot water from a given tank in the course of a day, under normal household use, with a 2 k. w. heater as we could get by any other arrangement with a 4 k. w. heater. This includes a small saving in loss by radiation, which by this invention is reduced from 95 to 80 watts each 24 hours in a 30-gallon tank.

The above described difference in the effect of the two heaters may be accentuated, if desired, by making the guide-tube $X^2$ of the upper heater shorter, either by removing the lower half thereof as it now appears in Fig. 1, or by making one or more openings P therein as is shown. Thereby the super heater acts on water of a higher initial temperature and the local circulation in the upper zone is accelerated. In any event the guide tubes are of importance in isolating from the body of water the rapidly circulating vertical columns within them.

What we claim as new and desire to secure by Letters Patent is:

1. A hot-water storge tank provided with a long-time heater at the bottom and a short-time heater at the top, each heater being immersed in a separate vertical water-column isolated from the main body of water but communicating therewith at top and bottom.

2. A hot-water storage tank provided with a lower heater controlled by a lower thermostat and a higher heater controlled by a higher thermostat, each heater acting on a separate vertical water-column isolated from the main body of water but communicating therewith at top and bottom.

3. A hot-water storage tank provided with a lower heater controlled by a lower thermostat and a higher heater controlled by a higher thermostat, each heater acting on a separate vertical water column isolated from the main body of water but communicating therewith at top and bottom and the column for the higher heater being shorter than that for the lower heater.

Signed at Albany, county of Albany and State of New York, this 11th day of June, 1928.

LEE P. HYNES.
HARRY A. WILLIAMS.